US012325009B2

(12) United States Patent
Shi et al.

(10) Patent No.: US 12,325,009 B2
(45) Date of Patent: Jun. 10, 2025

(54) IMPELLER ASSEMBLY AND MIXING APPARATUS

(71) Applicant: Shangshui Smartech Ltd., Guangdong (CN)

(72) Inventors: Qiao Shi, Guangdong (CN); Yongcheng Xu, Guangdong (CN); Shujuan Bai, Guangdong (CN); Xudong Jin, Guangdong (CN)

(73) Assignee: Shangshui Smartech Ltd., Shenzhen (CN)

( * ) Notice: Subject to any disclaimer, the term of this patent is extended or adjusted under 35 U.S.C. 154(b) by 0 days.

(21) Appl. No.: 18/550,414

(22) PCT Filed: Oct. 9, 2022

(86) PCT No.: PCT/CN2022/123953
§ 371 (c)(1),
(2) Date: Sep. 13, 2023

(87) PCT Pub. No.: WO2023/061271
PCT Pub. Date: Apr. 20, 2023

(65) Prior Publication Data
US 2024/0189786 A1 Jun. 13, 2024

(30) Foreign Application Priority Data
Oct. 13, 2021 (CN) .......................... 202111190681.9

(51) Int. Cl.
*B01F 27/1132* (2022.01)
*B01F 27/1111* (2022.01)
(Continued)

(52) U.S. Cl.
CPC ... *B01F 27/1132* (2022.01); *B01F 2215/0422* (2013.01)

(58) Field of Classification Search
CPC ........ B01F 23/53; B01F 25/64; B01F 23/565; B01F 23/59; B01F 25/52;
(Continued)

(56) References Cited

U.S. PATENT DOCUMENTS 2,468,389 A * 4/1949 Auer ................... B01F 27/2711 241/46.06
5,498,766 A * 3/1996 Stuart ...................... C13K 1/02 435/99
(Continued)

FOREIGN PATENT DOCUMENTS

CN 1386983 A 12/2002
CN 1543376 A 11/2004
(Continued)

OTHER PUBLICATIONS

Machine Translation of RU 2208472 [retrieved on Oct. 15, 2024]. Retrieved from: Espacenet. (Year: 2024).*
(Continued)

*Primary Examiner* — Eric J Zamora Alvarez
(74) *Attorney, Agent, or Firm* — HAUPTMAN HAM, LLP

(57) ABSTRACT

The present application discloses an impeller assembly and a mixing apparatus, and relates to the technical field of solid and liquid mixing devices. The impeller assembly includes an impeller structure and a housing structure. The impeller structure includes a body, and a surface of the body is provided with a plurality of backward-skewed blades. A blade angle of each backward-skewed blade on any flow plane first decreases progressively and then increases progressively from an inlet to an outlet. A first baffle is disposed on a lower portion of the body. The housing structure includes a second baffle. The first baffle is provided with first guide slots, and the second baffle is provided with second guide slots. A fluid enters from the inlet at an upper portion
(Continued)

of the body, flows along the surface of the body, and flows out through the outlet at a lower portion of the body and through the first guide slots and the second guide slots. A centerline of each first guide slot is deflected towards a direction opposite to a rotation direction of the impeller structure, and a centerline of each second guide slot is deflected towards the rotation direction of the impeller structure. The present application solves the problems of unstable discharge, large vibration and noise, and insufficient work efficiency.

7 Claims, 4 Drawing Sheets

(51) Int. Cl.

| | |
|---|---|
| ***B01F 27/271*** | (2022.01) |
| ***B01F 27/71*** | (2022.01) |
| ***B01F 27/86*** | (2022.01) |
| ***B01F 35/71*** | (2022.01) |

(58) Field of Classification Search

CPC .............. B01F 2215/0422; B01F 23/56; B01F 27/111; B01F 27/1132; B01F 27/2121; B01F 27/2711; B01F 27/2123; B01F 27/2723; B01F 35/7175; B01F 27/1111; B01F 27/711; B01F 27/861; F04D 1/00; F04D 13/06; F04D 29/4206; F04D 17/18; F04D 29/2288

See application file for complete search history.

(56) References Cited

U.S. PATENT DOCUMENTS

| | | | |
|---|---|---|---|
| 5,932,270 A | 8/1999 | Rock et al. | |
| 6,783,271 B1 | 8/2004 | Makarenko et al. | |
| 2009/0268547 A1 | 10/2009 | Pardikes | |
| 2012/0315675 A1* | 12/2012 | Medoff | C12P 19/02 435/141 |
| 2020/0222863 A1 | 7/2020 | Onishi et al. | |

FOREIGN PATENT DOCUMENTS

| | | | |
|---|---|---|---|
| CN | 107530710 | A | 1/2018 |
| CN | 207667471 | U | 7/2018 |
| CN | 108465388 | A | 8/2018 |
| CN | 110215857 | A | 9/2019 |
| CN | 210993907 | U | 7/2020 |
| EP | 2609999 | A1 | 7/2013 |
| JP | S5481559 | A | 6/1979 |
| JP | H0515758 | A | 1/1993 |
| JP | H0660638 | B2 | 8/1994 |
| JP | 2004249197 | A | 9/2004 |
| JP | 2011236919 | A | 11/2011 |
| JP | 2013132574 | A | 7/2013 |
| JP | 2020175379 | A | 10/2020 |
| RU | 2033252 | C1 | 4/1995 |
| RU | 2158629 | C1 | 11/2000 |
| RU | 2208472 | C1 | 7/2003 |
| WO | 2004098761 | A1 | 11/2004 |
| WO | 2017212935 | A1 | 12/2017 |

OTHER PUBLICATIONS

First Office Action issued in corresponding CN applicant No. 202111117446.9 dated Jun. 3, 2023.

Second Office Action issued in corresponding CN applicant No. 202111117446.9 dated Aug. 29, 2023.

WIPO, International Search Report and Written Opinion for International Application No. PCT/CN2022/123953, Dec. 28, 2022.

Extended European Search Report issued in corresponding EP application No. 22880210.4 dated Sep. 13, 2024.

Decision to Grant a Patent issued in corresponding JP application No. 2023-558648 dated Jan. 29, 2025.

* cited by examiner

IMPELLER ASSEMBLY AND MIXING APPARATUS

CROSS-REFERENCE TO RELATED APPLICATION

This application claims priority of Chinese patent application No. 202111190681.9, filed with the Chinese Patent Office on Oct. 13, 2021 and entitled "Impeller Assembly and Mixing Apparatus", which is hereby incorporated by reference in its entirety.

TECHNICAL FIELD

The present application relates to the technical field of solid and liquid mixing devices, in particular to an impeller assembly and a mixing apparatus.

BACKGROUND

In the related art, there is no special design on the blade type of blades on an inner side and flow paths of a fluid. The blades have limited ability to do work on the fluid, and multiple layers of baffles greatly hinder the movement of the fluid, making it difficult for discharge, so the fluid needs to be accelerated and discharged by using the work done by discharge blades on an outer side of the baffles. However, the forced acceleration and discharge of the fluid by the discharge blades will lead to large pressure fluctuations in a discharge chamber, thereby causing pulsations in the discharge flow, generating large noise and vibration, and reducing the work efficiency of a dispersion apparatus.

SUMMARY OF THE INVENTION

An object of the present application is to provide an impeller assembly and a mixing apparatus to solve the above-mentioned problems of the prior art, thus solving the problems of unstable discharge, large vibration and noise, and insufficient work efficiency that are liable to occur in a dispersion apparatus using a centrifugal discharge method when the viscosity of a solid-liquid mixture is large.

To Achieve the Above Object, the Present Application Provides the Following Technical Solution The present application provides an impeller assembly, including an impeller structure and a housing structure that are rotatable relative to each other, wherein the impeller structure includes a body, a surface of the body is provided with a plurality of backward-skewed blades distributed circumferentially around the body, at least one layer of first baffle is provided on a lower portion of the body, and the first baffle is arranged on an outer side of the backward-skewed blades: the housing structure includes at least one layer of second baffle which is located on an inner side and/or an outer side of the first baffle: the first baffle is provided with a plurality of first guide slots, and the second baffle is provided with a plurality of second guide slots: the impeller structure and the housing structure are configured to allow a fluid to enter from an inlet at an upper portion of the body, flow along the surface of the body, and flow out through an outlet at a lower portion of the body and through the first guide slots and the second guide slots: and a centerline of each first guide slot is deflected towards a direction opposite to a rotation direction of the impeller structure, and a centerline of each second guide slot is deflected towards the rotation direction of the impeller structure.

In an embodiment of the present application, the size of the body increases progressively from the upper portion of the body to the lower portion of the body, and the surface of the body is a curved surface.

In an embodiment of the present application, a blade angle of each backward-skewed blade on any flow plane first decreases progressively and then increases progressively from the inlet to the outlet, the blade angle being an included angle between a tangent line of a surface arc line of the backward-skewed blade and an axial plane of the impeller structure.

In an embodiment of the present application, the magnitude of the blade angle at the inlet is 20-80°, and the magnitude of the blade angle at the outlet is 0-30°.

In an embodiment of the present application, an included angle between the centerline of each first guide slot and a radial direction of a central axis of the body is 15-50°.

In an embodiment of the present application, an included angle between the centerline of each second guide slot and a radial direction of a central axis of the body is 35-80°.

The present application also provides a mixing apparatus including the impeller assembly.

Compared with the Prior Art, the Present Application has the Following Technical Effects The present application uses the backward-skewed blade that when rotating, can be better coupled with rotation of fluid flow, so that the backward-skewed blade provided on the body does work on the fluid more efficiently. In particular, it is found by simulation calculations that by designing the blade angle of each backward-skewed blade on any flow plane to first decrease progressively and then increase progressively from the inlet to the outlet, the backward-skewed blade can do work on the fluid more efficiently. On the other hand, the first guide slots are formed on the first baffle, and the second guide slots are formed on the second baffle, and a kinetic energy loss generated when the fluid passes through the first baffle and the second baffle is reduced by the directions of the first guide slots and the second guide slots. After dispersed in a dispersion area between the first baffle and the second baffle, the fluid still has sufficient kinetic energy to be discharged in a centrifugal way, without the need to add discharge blades for doing work on the fluid. This greatly reduces disturbance to the fluid in a discharge area, so that the fluid pressure in the discharge area can remain uniform and stable, and the fluid can be discharged at a stable flow rate, thus eliminating vibration and noise caused by pulsation.

BRIEF DESCRIPTION OF THE DRAWINGS

To describe technical solutions in embodiments of the present application or in the prior art more clearly, a brief introduction to the drawings for use in embodiments will be given below. Obviously, the drawings described below are only some embodiments in the present application, and for those of ordinary skill in the art, other drawings may also be obtained based on these drawings without creative work.

Figure 1:
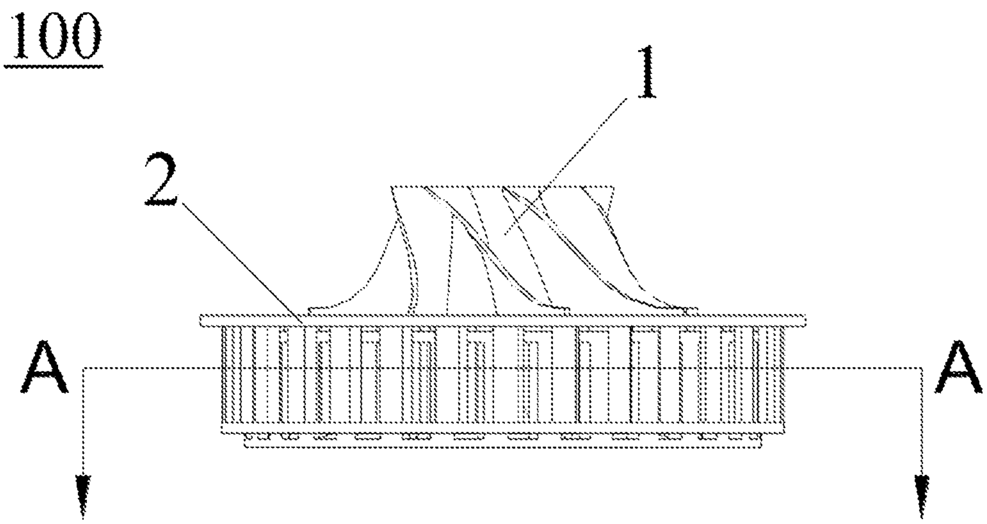
FIG. 1 is a schematic diagram of an impeller assembly in the present application.

Reference numerals: 100—impeller assembly, 1—impeller structure, 2—housing structure, 3—body, 4—backward-skewed blade, 5—first baffle, 6—second baffle, 7—first guide slot, 8—second guide slot.

DETAILED DESCRIPTION

Technical solutions in embodiments of the present application will be described below clearly and completely in conjunction with the accompanying drawings in the embodiments of the present application. Obviously, the described embodiments are only a part of the embodiments of the present application, and not all the embodiments. All other embodiments obtained by those of ordinary skill in the art without creative work, based on the embodiments in the present application, fall into the protection scope of the present application.

An object of the present application is to provide an impeller assembly and a mixing apparatus to solve the above-mentioned problems of the prior art, thus solving the problems of unstable discharge, large vibration and noise, and insufficient work efficiency that are liable to occur in a dispersion apparatus using a centrifugal discharge method when the viscosity of a solid-liquid mixture is large.

To make the above object, features and advantages of the present application more obvious and understandable, the present application will be described further in detail below in conjunction with the accompanying drawings and specific implementations.

Embodiment 1

As shown in FIGS. 1 to 5, this embodiment provides an impeller assembly 100, including an impeller structure 1 and a housing structure 2 that are rotatable relative to each other. The impeller structure 1 includes a body 3. A surface of the body 3 is provided with a plurality of backward-skewed blades 4 distributed circumferentially around the body 3. At least one layer of first baffle 5 is provided on a lower portion of the body 3, and the first baffle 5 is arranged on an outer side of the backward-skewed blades 4. The housing structure 2 includes at least one layer of second baffle 6. The second baffle 6 is located on an inner side and/or an outer side of the first baffle 5. In this embodiment, the housing structure 2 is provided with an inner layer and an outer layer of second baffle 6, on an inner side and arranged on an outer side of the first baffle 5, respectively, and the second baffle 6 is nested and buckled at an outer periphery of the first baffle 5. The first baffle 5 is circumferentially provided with a plurality of first guide slots 7, and the first guide slots 7 are uniformly distributed on the first baffle 5. The second baffles 6 on the inner side and the outer side are circumferentially provided with a plurality of second guide slots 8, respectively, and the second guide slots 8 are uniformly distributed on the second baffles 6. The cross-sectional shapes of the first guide slots 7 and the second guide slots 8 are similar to rhombuses, and deflected directions of the first guide slots 7 and deflected directions of the second guide slots 8 are arranged alternately. The impeller assembly 100 is provided with an inlet of a fluid at an upper end of the body 3 of the impeller structure 1, and like an outlet of the fluid at a lower end of the body 3 of the impeller structure 1. The fluid enters from the inlet at an upper portion of the body 3, flows along the surface of the body 3, and flows out successively through the outlet at a lower portion of the body 3, the second guide slots 8 on the inner side, the first guide slots 7, and the second guide slots 8 on the outer side. A centerline of each first guide slot 7 is deflected towards a direction opposite to a rotation direction of the impeller structure 1, and a centerline of each second guide slot 8 is deflected towards the rotation direction of the impeller structure 1.

Figure 2:
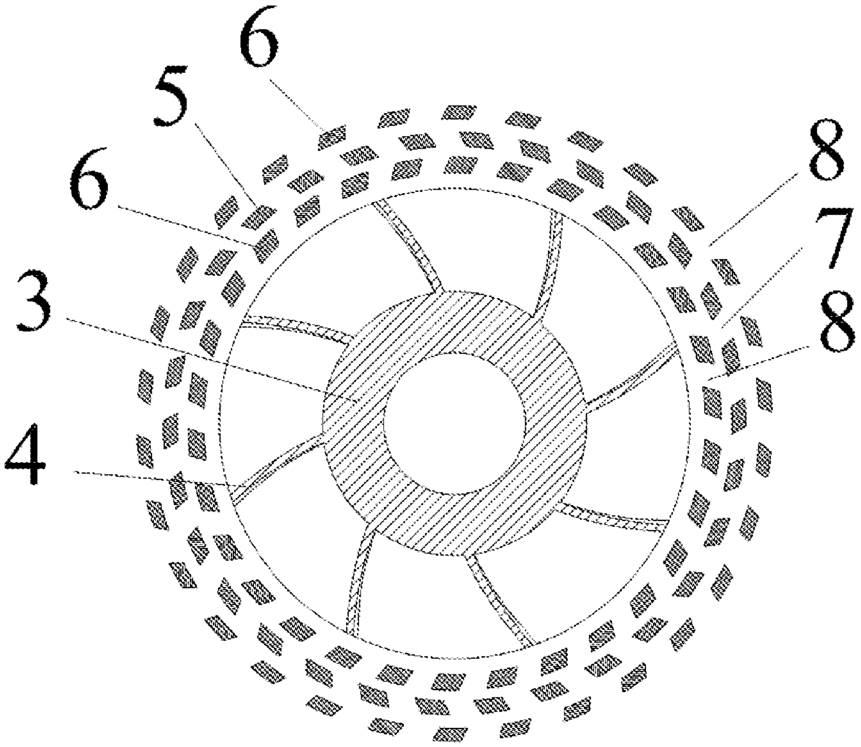
FIG. 2 is a sectional view along A-A in FIG. 1.

In this embodiment, using a placement direction of FIG. 2 as a reference, the impeller structure 1 rotates around an axis of the body 3 in a clockwise direction.

In this embodiment, the size of the body 3 increases progressively from the upper portion of the body 3 to the lower portion of the body 3 such that the body 3 forms a truncated cone, and the surface of the body 3 is a curved surface. A meridional flow path line of the body 3 from the inlet to the outlet is a quasi-arc curve that is bent inwardly.

In this embodiment, a blade angle a of each backward-skewed blade 4 on any flow plane first decreases progressively and then increases progressively from the inlet to the outlet. The blade angle $\alpha$ is an included angle between a tangent line T of a surface arc line S of the backward-skewed blade 4 and an axial plane M of the impeller structure 1, and takes a positive value.

In this embodiment, a gap between the backward-skewed blade 4 and the housing changes continuously and smoothly from the inlet to the outlet.

In this embodiment, the magnitude of the blade angle at the inlet is 20-80°, and the magnitude of the blade angle at the outlet is 0-30°, and the magnitude of the smallest blade angle is 0-30°. The angle distribution of the blade angle is related to the aerodynamic load distribution of the backward-skewed blade 4. Based on a simulation result of the fluid in the backward-skewed blade 4, the angle distribution of the blade angle is adjusted to achieve better coupling between the fluid and the backward-skewed blade 4 after the fluid flows therethrough to ensure that the backward-skewed blade 4 does work on the fluid efficiently.

In this embodiment, an included angle (i.e., $\beta_2$) between the centerline of each first guide slot 7 and a radial direction of a central axis L' of the body 3 is 15-50°, and an included angle (i.e., $\beta_1$ and $\beta_3$) between the centerline of each second guide slot 8 and the radial direction of the central axis L' of the body 3 is 35-80°. Specifically referring to FIG. 3, $\beta_1$ is an angle between a centerline L1 of a second guide slot 8 on the inner side and a radial line R1, $\beta_2$ is an angle between a centerline L2 of a first guide slot 7 and a radial line R2, and β3 is an angle between a centerline L3 of a second guide slot 8 on the outer side and a radial line R3. The radial line R1, the radial line R2 and the radial line R3 are all lines along a radius direction starting from the central axis L' of the body 3. A point of intersection between the centerline L1 of the second guide slot 8 of the second baffle 6 on the inner layer and the radial line R1 is located on the circumference where an inner wall of the second baffle 6 on the inner layer is located, a point of intersection between the centerline L2 of the first guide slot 7 and the radial line R2 is located on the circumference where an inner wall of the first baffle 5 is located, and a point of intersection between the centerline L3 of the second guide slot 8 of the second baffle 6 on the outer side and the radial line R3 is located on the circumference where an inner wall of the second baffle 6 on the outer layer is located.

Figure 3:
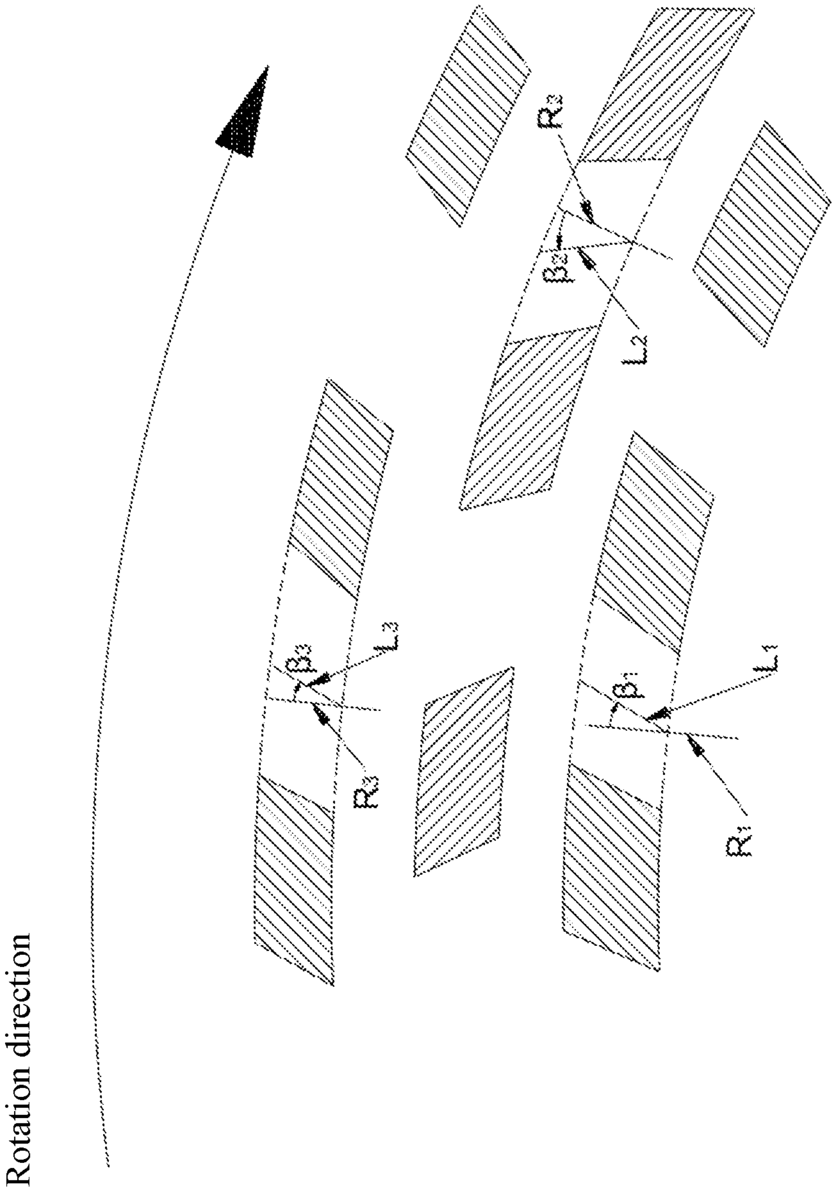
FIG. 3 is a partial enlarged view at I in FIG. 2.
Figure 4:
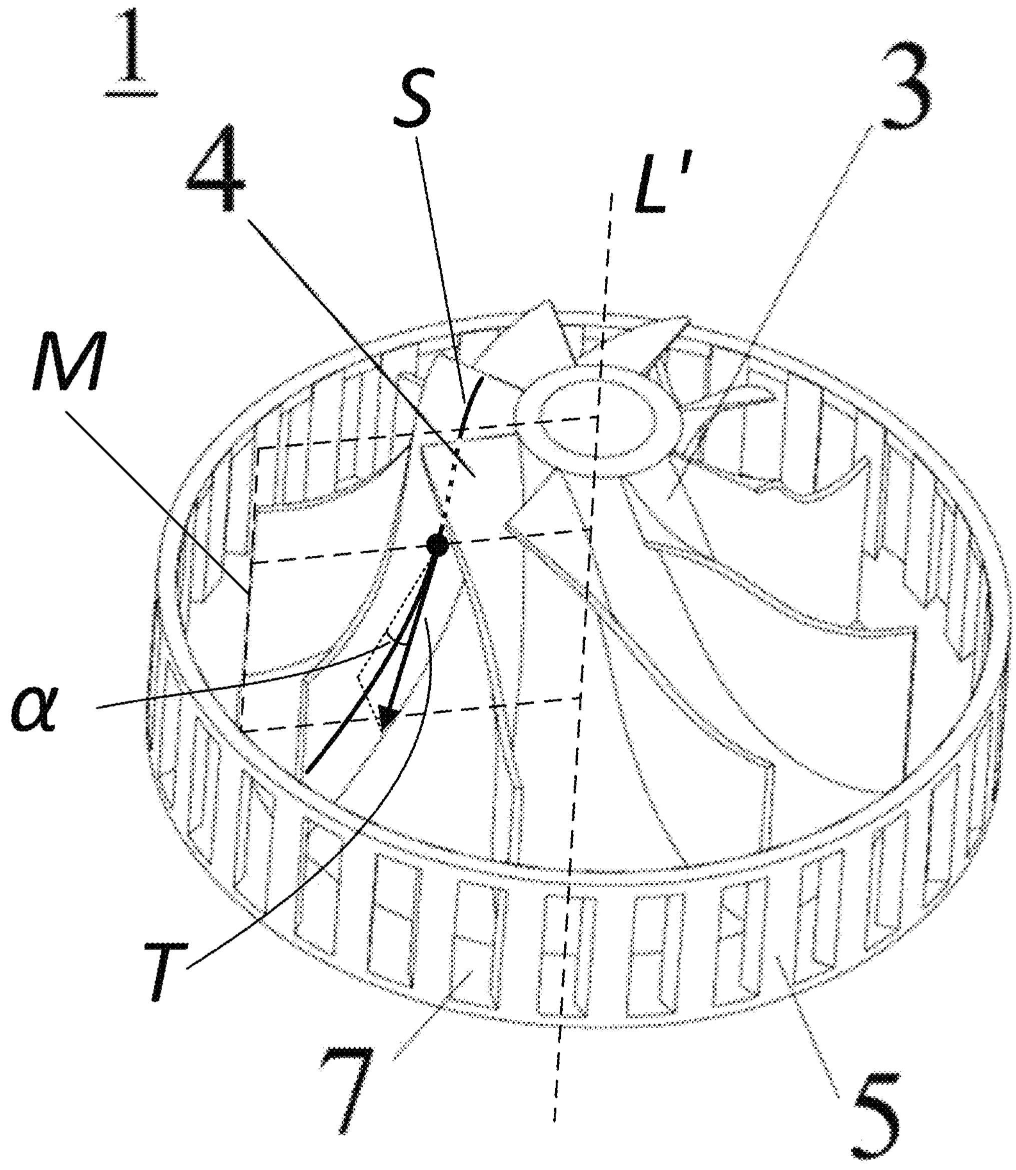
FIG. 4 is a schematic diagram of an impeller assembly in the present application.
Figure 5:
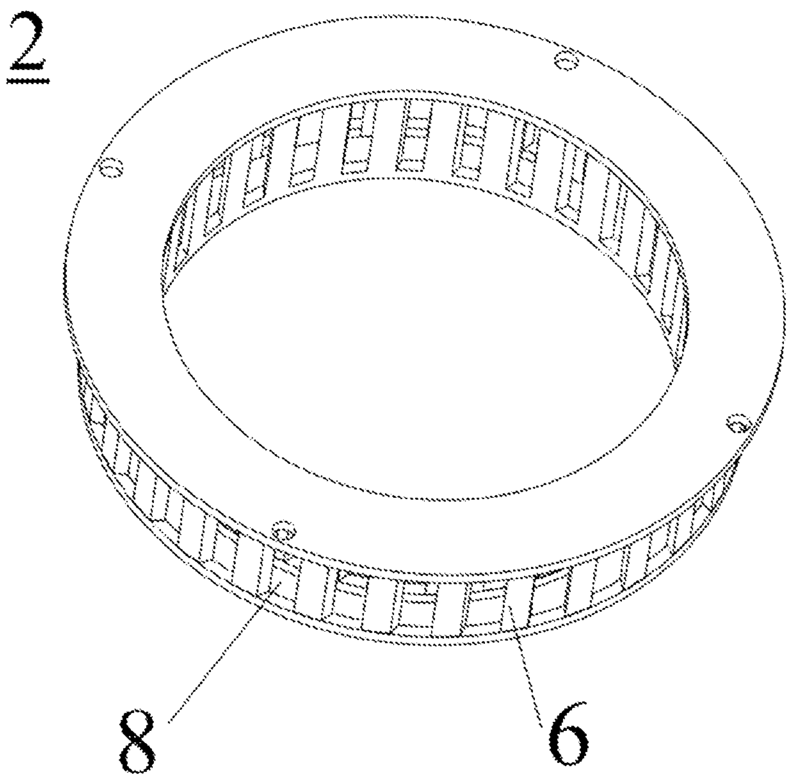
FIG. 5 is a schematic diagram of a housing structure in the present application.

The rotation direction of the impeller assembly 100 is denoted by an arrow in FIG. 3. In this embodiment, on the one hand, the blade angle is adjusted to control the fluid load distribution of the backward-skewed blade 4, and the blade angle distribution achieves better coupling between rotation of the backward-skewed blade 4 and fluid flow; so that the backward-skewed blade 4 provided on the body 3 does work on the fluid more efficiently: on the other hand, the first guide slots 7 are formed on the first baffle 5, and the second guide slots 8 are formed on the second baffle 6, and a kinetic energy loss generated when the fluid passes through the first baffle 5 and the second baffle 6 is reduced by the directions of the first guide slots 7 and the second guide slots 8. Specifically, the second baffle 6 fixed to the housing structure 2 is stationary, and the centerline of each second guide slot 8 is deflected towards the rotation direction of the impeller structure 1, which allows the fluid to pass through the second guide slot 8 smoothly without changing its direction greatly. The first baffle 5 fixed to the impeller structure 1 rotates together with the impeller structure 1, such that its remaining portion except for the first guide slots 7 can be regarded as an extension of the backward-skewed blade 4, and the first guide slots 7 can also made into a backward-skewed structure, which is more conducive to doing work on the fluid.

After dispersed in a dispersion area between the first baffle 5 and the second baffle 6, the fluid still has sufficient kinetic energy to be discharged in a centrifugal way, without the need to add discharge blades for doing work on the fluid on the outer side of the outermost second baffle 6. This greatly reduces disturbance to the fluid in a discharge area, so that the fluid pressure in the discharge area can remain uniform and stable, and the fluid can be discharged at a stable flow rate, thus eliminating vibration and noise caused by pulsation.

Embodiment 2

This embodiment provides a mixing apparatus including the impeller assembly 100 of Embodiment 1.

Specific embodiments are used in the specification to illustrate the principles and implementations of the present application, and the description of the above embodiments is only used to help understand the method of the present application and its core idea. Moreover, for those of ordinary skill in the art, there will be changes in specific implementations and application range based on the idea of the present application. In summary, the content of the specification should not be construed as a limitation on the present application.

What is claimed is:

1. An impeller assembly, comprising:

an impeller structure and a housing structure that are rotatable relative to each other, wherein the impeller structure comprises a body, a surface of the body is provided with a plurality of backward-skewed blades distributed circumferentially around the body, at least one layer of a first baffle is provided on a lower portion of the body, and the at least one layer of the first baffle is arranged on an outer side of the backward-skewed blades;

the housing structure comprises at least one layer of a second baffle which is located on an inner side and/or an outer side of the at least one layer of the first baffle;

the at least one layer of the first baffle is provided with a plurality of first guide slots, and the second baffle is provided with a plurality of second guide slots;

the impeller structure and the housing structure are configured to allow a fluid to enter from an inlet at an upper portion of the body, flow along the surface of the body, and flow out through an outlet at the lower portion of the body and through the first guide slots and the second guide slots;

a centerline of each first guide slot is deflected towards a direction opposite to a rotation direction of the impeller structure, and a centerline of each second guide slot is deflected towards the rotation direction of the impeller structure; and the housing structure comprises two layers of the second baffle, wherein a first layer of the second baffle is located on the inner side of the at least one layer of the first baffle and a second layer of the second baffle is located on the outer side of the at least one layer of the first baffle, and wherein the two layers of the second baffle are nested and buckled to surround the at least one layer of the first baffle.

2. The impeller assembly according to claim 1, wherein a size of the body increases progressively from the upper portion of the body to the lower portion of the body, and the surface of the body is a curved surface.

3. The impeller assembly according to claim 1, wherein a blade angle of each backward-skewed blade on any flow plane first decreases progressively and then increases progressively from the inlet to the outlet, the blade angle being an included angle between a tangent line of a surface arc line of the backward-skewed blade and an axial plane of the impeller structure.

4. The impeller assembly according to claim 3, wherein a magnitude of the blade angle at the inlet is 20-80°, and the magnitude of the blade angle at the outlet is 0-30°.

5. The impeller assembly according to claim 1, wherein an included angle between the centerline of each first guide slot and a radial direction of a central axis of the body is 15-50°.

6. The impeller assembly according to claim 1, wherein an included angle between the centerline of each second guide slot and a radial direction of a central axis of the body is 35-80°.

7. A mixing apparatus, comprising the impeller assembly of claim 1.

* * * * *